(12) United States Patent
Banning et al.

(10) Patent No.: US 7,619,075 B2
(45) Date of Patent: Nov. 17, 2009

(54) COLORANT COMPOSITIONS

(75) Inventors: Jeffery H. Banning, Hillsboro, OR (US); Donald R. Titterington, Newberg, OR (US); Clifford R. King, Hendersonville, NC (US)

(73) Assignee: Xerox Corporation, Norwalk, CT (US)

( * ) Notice: Subject to any disclaimer, the term of this patent is extended or adjusted under 35 U.S.C. 154(b) by 458 days.

(21) Appl. No.: 11/204,612

(22) Filed: Aug. 16, 2005

(65) Prior Publication Data

US 2005/0272902 A1 Dec. 8, 2005

Related U.S. Application Data

(62) Division of application No. 10/854,580, filed on May 25, 2004, now Pat. No. 6,969,759, which is a division of application No. 10/422,742, filed on Apr. 24, 2003, now Pat. No. 6,764,541.

(51) Int. Cl.
C09B 43/12 (2006.01)
C09B 43/26 (2006.01)

(52) U.S. Cl. .............. 534/729; 534/755; 534/759; 534/816; 534/829; 534/831; 534/591; 534/595

(58) Field of Classification Search ............ 534/729, 534/755, 759
See application file for complete search history.

(56) References Cited

U.S. PATENT DOCUMENTS

| | | | | |
|---|---|---|---|---|
| 3,271,383 | A * | 9/1966 | Yamaya et al. ........... 534/608 |
| 3,415,809 | A * | 12/1968 | Fisher et. al. ........... 534/608 |
| 3,653,932 | A | 4/1972 | Berry et al. ............. 106/22 |
| 3,912,712 | A * | 10/1975 | Peter et al. ............. 534/614 |
| 3,994,835 | A | 11/1976 | Wolf et al. ............. 260/2.5 |
| 4,132,840 | A | 1/1979 | Hugl et al. ............. 521/167 |
| 4,249,902 | A * | 2/1981 | Kruckenberg et al. ...... 8/525 |
| 4,255,326 | A | 3/1981 | Giles et al. |
| 4,284,729 | A | 8/1981 | Cross et al. ........... 521/158 |
| 4,292,239 | A * | 9/1981 | Kruckenberg et al. ...... 534/788 |
| 4,390,369 | A | 6/1983 | Merritt et al. ........... 106/31 |
| 4,400,320 | A | 8/1983 | Keller et al. ........... 260/158 |
| 4,484,948 | A | 11/1984 | Merritt et al. ........... 106/31 |
| 4,507,407 | A | 3/1985 | Kluger et al. ........... 521/113 |
| 4,594,454 | A | 6/1986 | Moore et al. ........... 564/305 |
| 4,601,725 | A * | 7/1986 | Keller et al. ............. 8/403 |
| 4,607,071 | A * | 8/1986 | Hahnke et al. ........... 524/189 |
| 4,658,064 | A | 4/1987 | Moore et al. ........... 564/443 |
| 4,684,956 | A | 8/1987 | Ball ................... 346/1.1 |
| 4,751,254 | A | 6/1988 | Kluger et al. ........... 521/163 |
| 4,758,243 | A | 7/1988 | Rekers et al. |
| 4,846,846 | A | 7/1989 | Rekers et al. ........... 8/515 |
| 4,851,045 | A | 7/1989 | Taniguchi ............. 106/31 |
| 4,889,560 | A | 12/1989 | Jaeger et al. ........... 106/27 |
| 4,889,761 | A | 12/1989 | Titterington et al. ...... 428/195 |
| 4,912,203 | A | 3/1990 | Kluger et al. ........... 534/729 |
| 5,006,170 | A | 4/1991 | Schwarz et al. ........... 106/20 |
| 5,043,013 | A | 8/1991 | Kluger et al. |
| 5,082,938 | A | 1/1992 | Kluger et al. ........... 544/38 |
| 5,108,460 | A | 4/1992 | Hines et al. ............. 8/403 |
| 5,151,120 | A | 9/1992 | You et al. ............. 106/27 |
| 5,182,372 | A * | 1/1993 | Derber et al. ........... 534/857 |
| 5,221,335 | A | 6/1993 | Williams et al. ........ 106/23 |
| 5,266,227 | A * | 11/1993 | Reichelt et al. ......... 508/184 |
| 5,270,363 | A | 12/1993 | Kluger et al. ........... 524/90 |
| 5,290,921 | A | 3/1994 | Moody et al. ........... 534/607 |
| 5,372,852 | A | 12/1994 | Titterington et al. ...... 427/288 |
| 5,456,725 | A | 10/1995 | Bruhnke ............... 8/403 |
| 5,496,879 | A | 3/1996 | Griebel et al. .......... 524/320 |
| 5,536,818 | A * | 7/1996 | Kaneko et al. .......... 534/577 |
| 5,549,853 | A * | 8/1996 | Beckmann et al. ....... 252/582 |
| 5,591,833 | A | 1/1997 | Hines et al. ........... 534/607 |
| 5,621,022 | A | 4/1997 | Jaeger et al. ........... 523/161 |
| 5,864,002 | A | 1/1999 | Stephens et al. ........ 528/77 |

(Continued)

FOREIGN PATENT DOCUMENTS

EP 0187352 7/1986

(Continued)

OTHER PUBLICATIONS

Hartmann G., Colloids and Surfaces, 57(3-4), 205-217, 1991.*

(Continued)

*Primary Examiner*—Fiona T Powers
(74) *Attorney, Agent, or Firm*—Judith L. Byorick; Marylou J. Lavoie

(57) ABSTRACT

Disclosed is a colorant composition of the formula

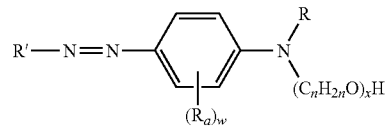

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule.

22 Claims, No Drawings

U.S. PATENT DOCUMENTS

| | | | | |
|---|---|---|---|---|
| 5,919,839 A | | 7/1999 | Titterington et al. | 523/161 |
| 5,994,546 A | * | 11/1999 | Kimura et al. | 546/165 |
| 2003/0061964 A1 | | 4/2003 | Batlaw | |

FOREIGN PATENT DOCUMENTS

| | | |
|---|---|---|
| EP | 0206286 | 12/1986 |
| FR | 2 393 036 | 12/1978 |
| FR | 2 409 287 | 6/1979 |
| FR | 2 442 258 | 6/1980 |
| GB | 1 577 842 | 10/1980 |
| WO | WO 94/04619 | 3/1994 |
| WO | WO 97/13816 | 4/1997 |

OTHER PUBLICATIONS

Copending application U.S. Serial No. (not yet assigned;), filed concurrently herewith, entitled "Colorant Compositions," by Jeffery H. Banning et al.

English abstract for DE 4205636AL.

English abstract for DE 4205713AL.

J. Miley, "Polymeric Colorants," *IUPAC Pure and Applied Chemistry*, vol. 68, No. 7, p. 1423 (1996).

* cited by examiner

COLORANT COMPOSITIONS

This application is a divisional of U.S. application Ser. No. 10/854,580, filed May 25, 2004, now U.S. Pat. No. 6,969,759, which is a divisional of U.S. application Ser. No. 10/422,742, filed Apr. 24, 2003, now U.S. Pat. No. 6,764,541, the disclosures of each of which are totally incorporated herein by reference.

CROSS-REFERENCES TO COPENDING APPLICATIONS

Copending application U.S. Ser. No. 10/422,755, filed Apr. 24, 2003, now U.S. Pat. No. 7,034,185, entitled "Colorant Precursor Compositions," with the named inventors Jeffery H. Banning, Donald R. Titterington, and Clifford R. King, the disclosure of which is totally incorporated herein by reference, discloses colorant precursor compounds of the formula

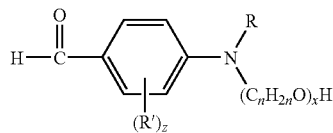

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said colorant precursor has no more than one —OH, —SH, or primary or secondary amino group per molecule.

Copending application U.S. Ser. No. 10/422,897, filed Apr. 24, 2003, now U.S. Pat. No. 6,790,267, entitled "Colorant Compositions," with the named inventors Jeffery H. Banning, Donald R. Titterington, and Clifford R. King, the disclosure of which is totally incorporated herein by reference, discloses colorant compounds of the formula

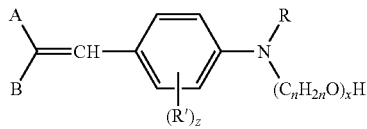

wherein R is an alkyl group, an aryl group, an arylalkyl group, or an alkylaryl group, and wherein R can be joined to the phenyl moiety to form a ring, each $R^1$, independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule.

Copending application U.S. Ser. No. 10/422,895, filed Apr. 24, 2003, U.S. Publication 20040214918, entitled "Colorant Compositions," with the named inventors Jeffery H. Banning, Donald R. Titterington, and Clifford R. King, the disclosure of which is totally incorporated herein by reference, discloses colorant compounds of the formula

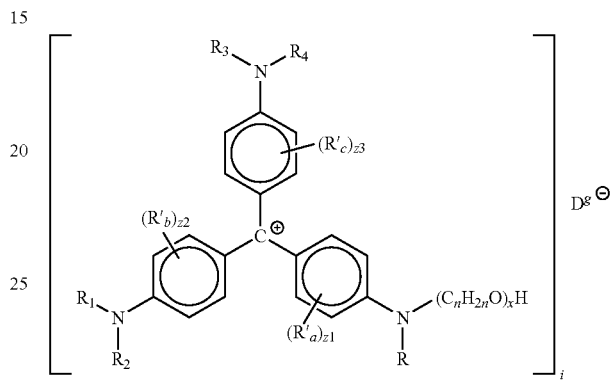

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R'_b$, and $R'_c$, independently of the others, is a halogen atom, an alkyl group, an alkoxy group, a nitrile group, a nitro group, an amide group, or a sulfonamide group, z1, z2, and z3 each, independently of the others, is an integer of 0, 1, 2, 3, or 4, n is an integer representing the number of carbon atoms in each repeat alkylene oxide unit, x is an integer representing the number of repeat alkylene oxide units, D is an anion, and g is the charge on the anion, wherein said colorant has no more than one —OH, —SH, or primary or secondary amino group per molecule.

BACKGROUND OF THE INVENTION

The present invention is directed to specific colorant compounds and to ink compositions containing these colorant compounds. More specifically, the present invention is directed to specific reactive azo colorant compounds and to ink compositions containing these colorant compounds. One embodiment of the present invention is directed to a colorant composition of the formula

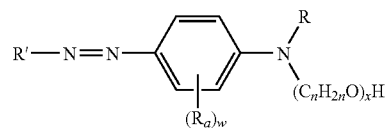

wherein R is an alkyl group, an aryl group, an arylalkyl group, or an alkylaryl group, and wherein R can be joined to the phenyl moiety to form a ring, $R^1$ is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule. Another embodiment of the present invention is directed to a compound comprising two or more moieties of the formula

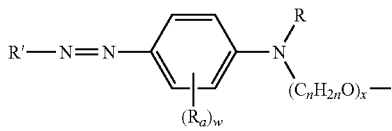

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer. Yet another embodiment of the present invention is directed to a phase change ink comprising a phase change ink carrier and a colorant compound comprising one or more moieties of the formula

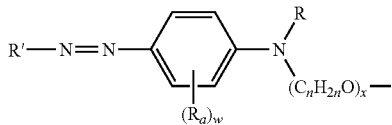

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein, when the colorant compound contains exactly one of the moieties, the moiety contains no more than one —OH, —SH, or primary or secondary amino group per molecule, and when the colorant compound contains more than one of the moieties, said moieties each contain no —OH groups, —SH groups, or primary or secondary amino groups.

In general, phase change inks (sometimes referred to as "hot melt inks") are in the solid phase at ambient temperature, but exist in the liquid phase at the elevated operating temperature of an ink jet printing device. At the hot operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,864,002 (Stephens et al.), the disclosure of which is totally incorporated herein by reference, discloses a method of providing for manufacturing a colored polymer resin having the steps of: (a) blending a disazo colorant into a mixture of monomers, the colorant having a poly(oxyalkylene) substituent comprising from 2 to 200 alkylene oxide residues, bonded to each end of the disazo chromophore, the poly(oxyalkylene) substituent having a nucleophilic terminal group which is capable of reacting with at least a portion of the monomers; (b) providing conditions under which the monomers and disazo colorant polymerize to form a colored polymer resin.

U.S. Pat. No. 5,591,833 (Hines et al.), the disclosure of which is totally incorporated herein by reference, discloses colorants and compositions useful as a fugitive or permanent colorant for a variety of substrates, or as intermediates for their manufacture, and having one or more improved properties of enhanced aqueous washability, compatibility with and non-extractibility from thermoplastic resins, or reactivity with resins having reactive functionality, said composition having the formula $C(Z)_{1-8}$ wherein C is the residue of a reactant having from 1 to 8 nucleophilic site residues to which the Z moieties are attached; said Z moieties containing at least about 60 weight percent of poly(oxyalkylene) which comprises (a) at least one glycidol residue segment of 2 to 6 glycidol residues attached to a nucleophilic site of C, wherein said poly(oxyalkylene) contains a total of from 2 to 20 glycidol residues, (b) and wherein said poly(oxyalkylene) further contains the residues of one or more other epoxide reactants of ethylene oxide (EO), propylene oxide (PO), or butylene oxide (BO), or mixtures thereof, wherein said poly (oxyalkylene) contains a total of from about 10 to about 600 of said EO, PO, or BO residues, or mixtures thereof, at least about 75 mole percent of which are EO residues, (c) and with the provisions that the ratio of the total of —O—PO— and —O—BO— linkages of all glycidol residues to the total of all functional oxy linkages of said glycidol residues is less than one, and the molar ratio of EO residues to glycidol residues is from 4 to 75.

U.S. Pat. No. 5,290,921 (Moody et al.), the disclosure of which is totally incorporated herein by reference, discloses primary hydroxyl enhanced colorants having markedly improved reactivities in e.g., polyurethane foams for imparting permanent coloring thereto, the colorants having the formula $C—(Z)^{1-4}$ wherein C is an azo, methine, or azamethine chromogen and Z is a poly(oxyalkylene) moiety comprising (1) at least two (A) units independently selected from those of the formulae —CH$_2$CH(O—T)CH$_2$O— or —CH$_2$CH(O—T)CH$_2$O—T and (2) from none to about 200 (B) units of the formula (—RO—) wherein R is straight or branched chain hydrocarbon of 2 to 4 carbons, T is a moiety of the formula —CH$_2$CH(R$_1$)—O—(RO)$_{0-40}$—CH$_2$CH$_2$OH wherein R$_1$ is selected from unsubstituted or substituted alkyl, aryl, alkenyloxyalkyl, alkoxyalkyl, or aryloxyalkyl, and wherein the A units comprise at least 0.5 percent of the total A+B units.

U.S. Pat. No. 5,108,460 (Hines et al.), the disclosure of which is totally incorporated herein by reference, discloses azo chromophores having polyoxyalkylene substituents that are linked together by a covalent bond or by an intervening connecting group to form dimers or trimers. The polyoxyalkylene substituents are straight or branched chain polymers primarily of ethylene oxide which make the dimer and trimer colorants useful as fugitive tints.

U.S. Pat. No. 5,082,938 (Kluger et al.), the disclosure of which is totally incorporated herein by reference, discloses enhanced branched chain hydroxyl compounds of formula Y—(Z)$_{1-6}$ wherein Y is the residue of a nucleophile devoid of conjugated divalent linking moieties, and each Z is a poly (oxyalkylene) moiety having a molecular weight of from about 200 to 10,000 and containing at least one glycidol residue, wherein at least one of the primary oxy sites of said glycidol residue is linked preferably directly to a first epoxide residue of three or more carbons, and wherein said first epoxide residue is linked through a secondary oxy site preferably directly to a second epoxide reside having a primary terminal hydroxyl.

U.S. Pat. No. 5,043,013 (Kluger et al.), the disclosure of which is totally incorporated herein by reference, discloses a washable aqueous ink composition having a viscosity of from about 1.0 to about 6.0 centipoise and containing from about 10 to about 50 percent by weight of one or more polymeric colorants of the formula

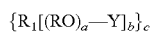

wherein X is a polar group such as sulfonic acids, sulfonic acid salts, sulfonamides, sulfonates or the like: R is alkylene; Y is H, alkanoyl, carbamoyl, or the like; R, is nitrogen, oxygen, sulfur, or a sulfur-containing divalent linking group; a is an integer of from six to about forty; b and c are each independently selected from one or two; d is an integer of from one to four; the product of (a) (b) (c) is an integer of from 6 to about 40; and CHROM is a chromophore such as nitro, nitroso, monoazo, disazo and trisazo, diarylmethane, triarylmethane, xanthane, acridine, methine, thiazole, indamine, azine, oxazine, or anthraquinone, wherein the (RO)$_a$ moiety is bonded to a carbocyclic aromatic ring of the (CHROM) through R$_1$.

U.S. Pat. No. 4,751,254 (Kluger et al.), the disclosure of which is totally incorporated herein by reference, discloses a process for coloring polyurethane resins during the production of same with reactive colorants derived from polyalkoxytrifluoroaniline intermediates. These colorants impart increased brightness in shade for both aromatic and heteroaromatic derivatives and increased resistance to stannous octanoate catalyst over conventional polymeric colorants derived for heteroaromatic compounds. These colorants have the structure

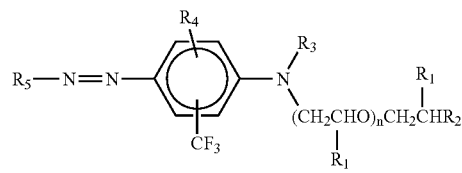

wherein R$_1$ is selected from H, a lower alkyl group containing from 1 to about 10 carbon atoms, CH$_2$Cl, CH$_2$OH, phenyl, or

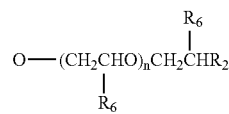

where R$_6$ is H or a lower alkyl group containing from 1 to about 9 carbon atoms; R$_2$ is selected from OH, NH$_2$, or SH; R$_3$ is selected from a lower alkyl group containing from 1 to about 9 carbon atoms, cyanoalkyl, acetoxyalkyl, or

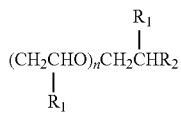

where $R_1$ and $R_2$ are as given above; $R_4$ is H, $CF_3$, a lower alkyl group containing from 1 to about 9 carbon atoms, Cl, or Br and n is 0 or an integer from 1 to about 125. $R_5$ is an aromatic or heteroaromatic containing group, said colorants being resistant to stannous octanoate, being characterized as having improved brightness and which have functionality through reactive substituents thereof.

U.S. Pat. No. 4,658,064 (Moore et al.), the disclosure of which is totally incorporated herein by reference, discloses a compound of the formula

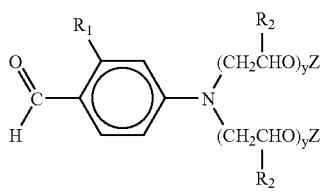

wherein $R_1$ is selected from alkyl, halide, or alkoxy; $R_2$ is selected from H or alkyl; Y is a number of from 2 to about 200; and Z is selected from H or

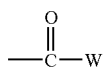

where W is alkyl.

U.S. Pat. No. 4,594,454 (Moore et al.), the disclosure of which is totally incorporated herein by reference, discloses a compound of the formula

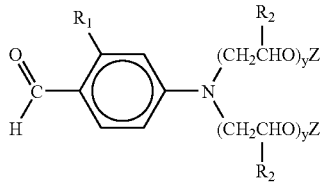

wherein $R_1$ is selected from alkyl, halide, or alkoxy; $R_2$ is selected from H or alkyl; Y is a number of from 2 to about 200; and Z is selected from H or

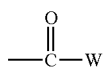

where W is alkyl.

U.S. Pat. No. 4,400,320 (Keller et al.), the disclosure of which is totally incorporated herein by reference, discloses fugitive tints which are characterized by the formula

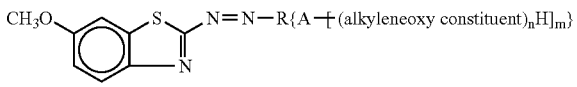

where R is selected from meta-toluidene, meta-amino phenol, aniline, or dimethoxy aniline, A is selected from N, O, S, or $CO_2$; the alkylene group of the alkyleneoxy constituent contains from 2 to about 4 carbon atoms; n is an integer of from 2 to about 300; m is 1 when A is O, S, or $CO_2$, and 2 when A is N; x is an integer of from 1 to about 5; and the product of n times m times x (n·m·x) is from 2 to about 400. Also disclosed is a process for preparing alkyleneoxy fugitive tints.

U.S. Pat. No. 4,284,729 (Cross et al.), the disclosure of which is totally incorporated herein by reference, discloses a process for coloring thermosetting resins, made by polyaddition reaction of a nucleophile with an electrophile, with a polymeric liquid reactive coloring agent suitable for incorporation in the resin with the formation of covalent bonds, said coloring agent having the formula

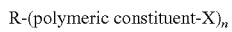

R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; and n is an integer of from 1 to about 6; and X is selected from —OH, —$NH_2$, and —SH, said coloring agent being added in an amount sufficient to provide coloration of said thermosetting resin.

U.S. Pat. No. 4,132,840 (Hugl et al.), the disclosure of which is totally incorporated herein by reference, discloses polyurethane plastics that are dyed with dyestuffs of the formula

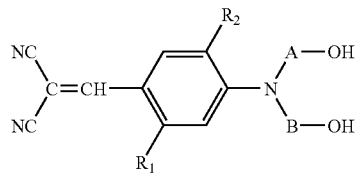

wherein $R_1$ denotes hydrogen, halogen, optionally substituted $C_1$-$C_4$ alkyl, optionally substituted $C_1$-$C_4$ alkoxy, and optionally substituted $C_1$-$C_4$ alkylcarbonylamino and $R_2$ denotes hydrogen, optionally substituted $C_1$-$C_4$ alkyl, and optionally substituted $C_1$-$C_4$ alkoxy, while A and B denote optionally branched alkylene chains which can be identical or different and preferably have 2 to 6 carbon atoms, with formation of covalent bonds, in that the dyestuffs are added before or during the polyaddition reaction to the reaction mixture of polyol and polyisocyanate or to one of the components.

U.S. Pat. No. 3,994,835 (Wolf et al.), the disclosure of which is totally incorporated herein by reference, discloses dispersions of dyestuffs which contain at least one free amino or hydroxyl group capable of reacting with isocyanates under the conditions of polyaddition and liquids in which the dyes are soluble to an extent less than 2 percent which are suitable for the production of colored polyurethane foams. The dye dispersions can be added before or during the polyaddition reaction.

U.S. Pat. No. 5,270,363 (Kluger et al.), the disclosure of which is totally incorporated herein by reference, discloses a colorant for natural or synthetic resinous or polymeric materials, having the formula A-[SO$_2$—N(R$_2$)—Y]$_{1-4}$ wherein R$_2$ is selected for example from hydrogen, methyl, cyclohexyl, phenyl or Y; A is a nonionic metallophthalocyanine chromophore which can be substituted for example with halogen, alkyl, alkoxy, alkylthio, or aryloxy, Y is a poly(oxyalkylene) moiety containing at least three monomeric units or mixtures thereof of the formula (—RO—) wherein each R is straight or branched alkylene of 1 to 4 carbons or mixtures thereof, up to about 20 mole percent of said monomeric units may be connected by one or more linking groups such as alkyleneoxy, —NH—, or —NHCONH—, and wherein Y can be terminated by hydrogen, or by at branch substituents, containing 1 to 3 groups or moieties selected from alkyl, cycloalkyl, acyl, or aryl; wherein any of the above recited hydrocarbon groups, moieties or substituents may themselves be substituted with up to four substituents selected, for example, from alkyl, halogen, mercapto, alkoxycarbonyl, hydroxy, alkoxy, or the like; and wherein each aliphatic hydrocarbon portion or moiety of the groups, moieties or substituents recited above contains from 1 to 20 carbons.

U.S. Pat. No. 4,912,203 (Kluger et al.), the disclosure of which is totally incorporated herein by reference, discloses thiophene based colorants useful for coloring thermoset resins such as polyurethanes being of the formula

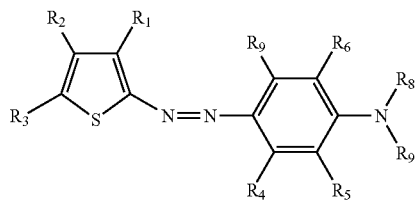

wherein R$_1$, R$_2$, and R$_3$ are selected from halogen, carboxylic acid, alkanoyl, aryloyl, carbocyclic forming polymethylene chains, alkyl, aryl, cyano, thioalkyl, dithioalkyl, thioaryl, dithioaryl, thiocyano, carboxyalkyl, carboxyaryl, amidoalkyl, amidodialkyl, amidoaryl, amidodiaryl, oxyalkyl, thioamidoalkyl, thioamidodialkyl, or hydrogen when an adjacent group is isobutyryl; R$_4$, R$_5$, and R$_7$ are selected from hydrogen alkyl, oxyalkyl, sulfonamidoalkyl, sulfonamidoaryl, amidoalkyl, amidodialkyl, amidoaryl, amidodiaryl, halogen, thioalkyl, and thioaryl; and R$_8$ and R$_9$ are selected from polyalkylene oxide, copolymers of polyalkylene oxides, and hydroxyalkylenes.

U.S. Pat. No. 4,846,846 (Rekers et al.), the disclosure of which is totally incorporated herein by reference, discloses a process for coloring polyurethane resins made by a polyaddition reaction of a polyol and an isocyanate which comprises adding to the reaction mixture before or during the polyaddition reaction a reactive coloring agent suitable for incorporation in the resin with the formation of covalent bonds, said coloring agent having the formula

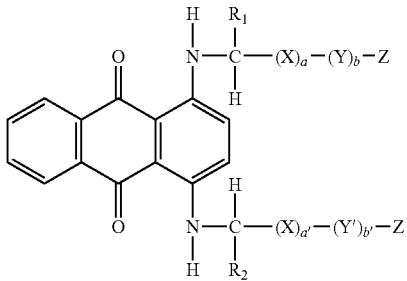

in which R$_1$ and R$_2$ are independently selected from an alkyl group having from 1 to about 12 carbon atoms, X is —CH$_2$—, a and a' are integers from 1 to about 6, and Y and Y' are independently selected from polymeric units of hydroxy alkylenes or alkylene oxide monomers selected from ethylene oxide, propylene oxide, butylene oxide, cyclohexene oxide, or glycidol, b and b' are independently either 0 or 1, and Z and Z' are reactive groups independently selected from —OH, —NH$_2$, or —SH.

U.S. Pat. No. 4,507,407 (Kluger et al.), the disclosure of which is totally incorporated herein by reference, discloses a process of coloring polyurethane resins during the production of same with reactive colorants having the formula

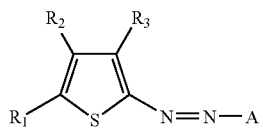

wherein R$_1$, R$_2$, R$_3$ are selected from halogen, carboxylic acid, alkanoyl, aryloyl, alkyl, aryl, cyano, sulfonylalkyl, sulfonylaryl, thioalkyl, thioaryl, sulfinylalkyl, sulfinylaryl, dithioalkyl, dithioaryl, thiocyano, amidoalkyl, amidodialkyl, oxyalkyl, oxyaryl, hydrogen, sulfonamidoalkyl, sulfonamidoaryl, sulfonamidodialkyl, sulfonamidodiaryl, carbocyclic forming polymethylene chains, sulfenamidoalkyl, sulfenamidodialkyl, sulfenamidoaryl, sulfenamidodiaryl, sulfinamidoalkyl, sulfinamidodialkyl, sulfinamidoaryl, sulfinamidodiaryl, and A is an organic dyestuff coupler that is resistant to stannous octanoate and flame retardant compounds and which has functionality through reactive substituents thereof.

U.S. Pat. No. 5,919,839 (Titterington et al.), the disclosure of which is totally incorporated herein by reference, discloses colored waxes made by reacting selected nucleophiles, including alcohol containing colorants, with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

U.S. Pat. No. 5,456,725 (Bruhnke), the disclosure of which is totally incorporated herein by reference, discloses a process for temporarily coloring a polyamide substrate whereby a poly(oxyalkylene) substituted methine colorant is applied to the substrate followed by heating the substrate with superheated steam at a temperature of 250° F. or greater, which effectively decolorizes the methine colorant.

PCT Patent Application WO 97/13816, the disclosure of which is totally incorporated herein by reference, discloses a colored material suitable for use in a hot melt ink comprising a oligomeric hot melt ink jet vehicle formed of molecules having a backbone and at least one pendant side-chain. A dyestuff is reacted onto the backbone. The material is preferably obtainable as the reaction product of an aliphatic or aromatic mono- or di-isocyanate and a hydroxyl group functional dye component, and optionally one or more other suitable material. Such suitable materials include mono- and dihydric alcohols, primary and secondary monoamines, functional amides, hydroxyl functional amines and hydroxyl containing components having a terminal unsaturated bond.

"Polymeric Colorants," J. Miley, *IUPAC Pure and Applied Chemistry*, Vol. 68, No. 7, p. 1423 (1996), the disclosure of which is totally incorporated herein by reference, discloses specific examples of polymeric colorants and how they meet functional requirements.

While known compositions are suitable for their intended purposes, a need remains for improved reactive azo colorants. In addition, a need remains for reactive azo colorants that are easily purified. Further, a need remains for reactive azo colorants that exhibit reduced toxicity. Additionally, a need remains for reactive azo colorants that are liquid at room temperature. There is also a need for reactive azo colorants that can be tailored for compatibility with various hydrophobic or hydrophilic applications. In addition, there is a need for reactive azo colorants that, when reacted with or reacted to form oligomers or polymers such as polyurethanes, polyanhydrides, or the like, resist migration and/or settling. Further, there is a need for reactive azo colorants that, when reacted with other materials, do not result in the formation of products of undesirably high molecular weight. Additionally, there is a need for reactive azo colorants that, when reacted with other materials, do not result in the formation of products with undesirable crosslinking. A need also remains for reactive azo colorants that, when reacted with other materials, form products suitable for use in phase change ink compositions. In addition, a need remains for reactive azo colorants that, when reacted with other materials, form products that, when incorporated into phase change ink compositions, exhibit reduced precipitation of the colorant from the ink. Further, a need remains for reactive azo colorants that, when reacted with other materials, form products that, when incorporated into phase change ink compositions, exhibit reduced clogging of printer heads and resulting printer failure.

SUMMARY OF THE INVENTION

The present invention is directed to a colorant composition of the formula

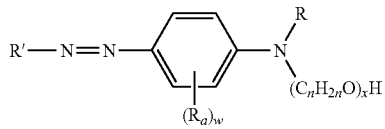

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said colorant has no more than one —OH, —SH, or primary or secondary amino group per molecule. Another embodiment of the present invention is directed to a compound comprising two or more moieties of the formula

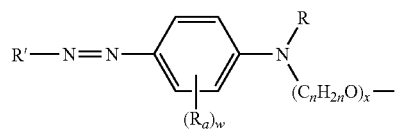

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer. Yet another embodiment of the present invention is directed to a phase change ink comprising a phase change ink carrier and a colorant compound comprising one or more moieties of the formula

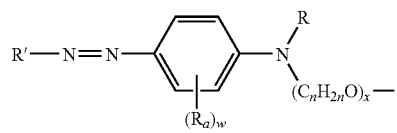

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein, when the colorant compound contains exactly one of the moieties, the moiety contains no more than one —OH, —SH, or primary or secondary amino group per molecule, and when the colorant compound contains more than one of the moieties, said moieties each contain no —OH groups, —SH groups, or primary or secondary amino groups.

DETAILED DESCRIPTION

The present invention is directed to a colorant of the formula

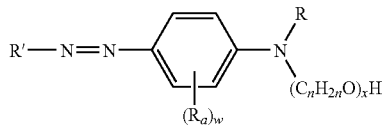

wherein R is an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, wherein the substituents on the substituted alkyl, aryl, arylalkyl, and alkylaryl groups can be (but are not limited to) halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, and the like, as well as mixtures thereof, and wherein two or more substituents can be joined together to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit (the alkylene oxide units can each have different numbers of carbon atoms; for example, the polyalkylene oxide chain can comprise a mixture of repeat ethylene oxide, propylene oxide, and/or butylene oxide units), and in one embodiment is at least about 2, and in one embodiment is no more than about 18, and in another embodiment is no more than about 4, although the value of n can be outside of these ranges, and x is an integer representing the number of repeat alkylene oxide units, and in one embodiment is at least about 2, and in another embodiment is at least about 5, and in one embodiment is no more than about 100, and in another embodiment is no more than about 20, although the value of x can be outside of these ranges, wherein said colorant has no more than one —OH, —SH, or —NHR$_b$ group (i.e., primary or secondary amino group) per molecule, wherein $R_b$ is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group.

If desired, various substituents (shown as $R_a$ groups on the structure) can be present on the central phenyl moiety of the structure to affect the color of the colorant. From 1 to 4 of such substituents can be present, which can be the same as each other or different from each other. Examples of such substituents include (but are not limited to) halogen atoms, such as fluorine, chlorine, bromine, and iodine, alkyl groups, in one embodiment with at least 1 carbon atom, and in one embodiment with no more than about 25 carbon atoms, such as methyl, ethyl, and the like, alkoxy groups, in one embodiment with at least 1 carbon atom, and in one embodiment with no more than about 25 carbon atoms, such as methoxy groups, ethoxy groups, and the like, nitrile groups, nitro groups, amide groups, such as an acetamido group or the like, including (but not limited to) those of the general formula

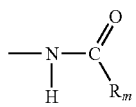

wherein $R_m$ is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group, such as an acetamido group or the like, sulfonamide groups, including (but not limited to) those of the formula

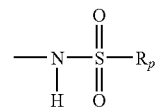

wherein $R_p$ is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group, or the like.

It should be noted that the R group can also be joined to the central phenyl moiety to form a ring; for example, compounds of the formulae

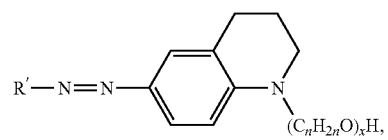

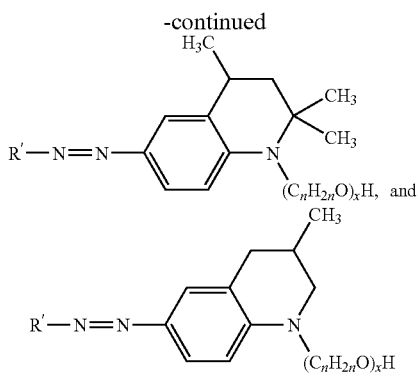

are within the scope of the above formula.

The colorants of the present invention can be prepared by, for example, reacting an N-alkyl aniline with suitable reactants to form a material of the formula

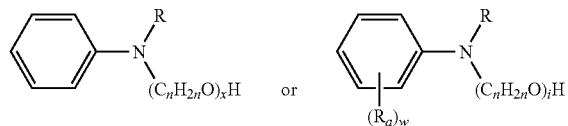

wherein R, $R_a$, w, n, and x are as defined hereinabove. More specifically, the corresponding N-alkyl aniline can be reacted with an epoxide compound containing the desired number of carbon atoms in the presence of a Lewis acid or a base. More specifically, if one wants, for example, a compound wherein n is 3 (i.e., a polypropylene oxide substituted compound), one can react the aniline with an epoxide compound of the formula

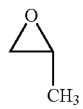

If one wants a compound wherein n is 2 (i.e., a polyethylene oxide substituted compound), one can react the aniline with an epoxide compound of the formula

The molar ratio of epoxide compound to N-alkyl aniline is such that the desired number of repeat alkylene oxide units per N-alkyl aniline molecule is obtained; for example, if it is desired to have a molecule with an average of about 10 repeat alkylene oxide units (i.e., x=10), the molar ratio of epoxide compound to N-alkyl aniline is about 10:1.

The reaction can take place in the presence of a catalyst which is either a base, such as potassium hydroxide or the like, or a Lewis acid, such as $BF_3$ etherate or the like. The catalyst is present in any desired or effective amount, in one embodiment at least about 0.01 mole of catalyst per every one mole of aniline, in another embodiment at least about 0.05 mole of catalyst per every one mole of aniline, and in yet another embodiment at least about 0.1 mole of catalyst per every one mole of aniline, and in one embodiment no more than about 0.3 mole of catalyst per every one mole of aniline, in another embodiment no more than about 0.2 mole of catalyst per every one mole of aniline, and in yet another embodiment no more than about 0.1 mole of catalyst per every one mole of aniline, although the relative amounts can be outside of these ranges.

Further information regarding these kinds of reactions is disclosed in, for example, Preparation 1 of U.S. Pat. No. 4,091,034, Example 1 of U.S. Pat. No. 4,167,510, Example 1 of U.S. Pat. No. 4,400,320, and Example 1A of U.S. Pat. No. 5,290,921, the disclosures of each of which are totally incorporated herein by reference.

Materials of the formula

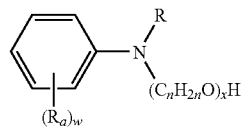

are also commercially available. For example, a material of this formula wherein n is 2 and x is 10 is available from, for example, Henkel Corporation, Mauldin, S.C. From the same company is also available as SO-7864 a similar material wherein both ethylene oxide and propylene oxide groups are randomly distributed through the polyalkylene oxide chain in an average molar ratio of about 3.5 moles of ethylene oxide groups to 6.5 moles of propylene oxide groups.

The azo colorants of the present invention are of the general formula

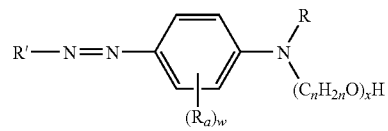

wherein R, n, and x are as defined hereinabove, and R' is an aromatic- or heteroaromatic-containing group. R' can be any aromatic-containing or heteroaromatic-containing group suitable for azo colorants. R' can be an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 2 carbon atoms, and in another embodiment with at least about 4 carbon atoms, and in one embodiment with no more than about 60 carbon atoms, and in another embodiment with no more than about 50 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 3 carbon atoms, in another embodiment with at least about 5 carbon atoms, and in yet another embodiment with at least about 7 carbon atoms, and in one embodiment with no more than about 60 carbon atoms, in another embodiment with no more than about 50 carbon atoms, and in yet another embodiment with no more than about 18 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 3 carbon atoms, in another embodiment with at least about 5 carbon atoms, and in yet another embodiment with at least about 7 carbon atoms, and in one embodiment with no more than about 60 carbon atoms, in another embodiment with no more than about 50 carbon atoms, and in yet another embodiment with no more than about 18 carbon atoms, although the number of carbon atoms can be outside of these ranges, such as tolyl or the like, and wherein the substituents on the substituted aryl, arylalkyl, and alkylaryl groups can be (but are not limited to) those indicated hereinabove as suitable for the R group.

Examples of R' groups include (but are not limited to) thiophene derivatives, benzothiazole derivatives, benzoisothiazole derivatives, thiadiazole derivatives, benzene derivatives, imidazole derivatives, and the like.

Specific examples of classes of R' groups include (but are not limited to) (a) those of the formula

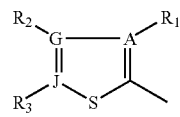

wherein A, G, and J each, independently of the others, is a carbon atom or a hetero atom, such as nitrogen, oxygen, sulfur, phosphorus, silicon, or the like, and $R_1$, $R_2$, and $R_3$ each, independently of the other, is a hydrogen atom, a halogen atom, such as fluorine, chlorine, bromine, or iodine, a cyano group, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, and in another embodiment with no more than about 18 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, and in another embodiment with no more than about 18 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 5 carbon atoms, in another embodiment with at least about 6 carbon atoms, and in yet another embodiment with at least about 7 carbon atoms, and in one embodiment with no more than about 50 carbon atoms, and in another embodiment with no more than about 18 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 5 carbon atoms, in another embodiment with at least about 6 carbon atoms, and in yet another embodiment with at least about 7 carbon atoms, and in one embodiment with no more than about 50 carbon atoms, and in another embodiment with no more than about 18 carbon atoms, although the number of carbon atoms can be outside of these ranges, alkoxy, aryloxy, arylalkyloxy, and alkylaryloxy groups, all of which either may or may not be substituted, wherein the alkyl, aryl, arylalkyl, and alkylaryl portions thereof are as defined hereinabove, sulfonamidoalkyl, sulfonamidoaryl, sulfonamidoarylalkyl, sulfonamidoalkylaryl, sulfonamidodialkyl, sulfonamidodiaryl, sulfonamidodiarylalkyl, and sulfonamidodialkylaryl groups, as well as combinations thereof, all of which either may or may not be substituted, wherein the alkyl, aryl, arylalkyl, and alkylaryl portions thereof are as defined hereinabove, amidoalkyl, amidoaryl, amidoarylalkyl, amidoalkylaryl, amidodialkyl, amidodiaryl, amidodiarylalkyl, amidodialkylaryl, and amidodiarylalkyl groups, as well as combinations thereof, all of which either may or may not be substituted, wherein the alkyl, aryl, arylalkyl, and alkylaryl portions thereof are as defined hereinabove, thioalkyl, thioaryl, thioarylalkyl, and thioalkylaryl groups, all of which either may or may not be substituted, wherein the alkyl, aryl, arylalkyl, and alkylaryl portions thereof are as defined hereinabove, ester groups of the formula

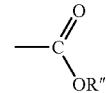

wherein R" can be substituted or unsubstituted alkyl, aryl, arylalkyl, and alkylaryl as defined hereinabove, ketone groups of the formula

wherein R'" can be substituted or unsubstituted alkyl aryl, arylalkyl, and alkylaryl as defined hereinabove, sulfone groups of the formula —SO$_2$R"" wherein R"" can be substituted or unsubstituted alkyl, aryl, arylalkyl, and alkylaryl as defined hereinabove, and the like, wherein the substituents on any of the substituted forms of these groups can be (but are not limited to) those indicated hereinabove for the R group; (b) those of the formula

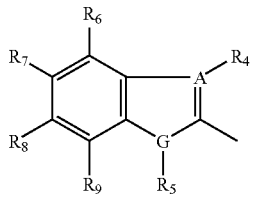

wherein A and G are as defined hereinabove and wherein $R_4$, $R_5$, $R_6$, $R_7$, $R_8$, and $R_9$ are defined as $R_1$, $R_2$, and $R_3$ hereinabove; or (c) those of the formula

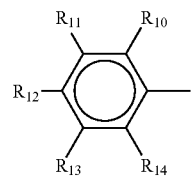

wherein $R_{10}$, $R_{11}$, $R_{12}$, $R_{13}$, and $R_{14}$ are defined as $R_1$, $R_2$, and $R_3$ hereinabove; and the like. It is to be understood that the A, G, and J groups have valencies appropriate to the selected atom, and that the number of "R" groups attached thereto can vary depending on the valency of the atom. For example, in groups of formula (b), when G is a carbon or silicon atom, two R groups can be attached thereto; when G is a nitrogen or phosphorus atom and the molecule is nonionic, one R group can be attached thereto; when G is a nitrogen or phosphorus atom and the molecule is cationic, two R groups can be attached thereto accompanied by a suitable anion; when G is an oxygen or sulfur atom and the molecule is nonionic, no R groups are attached thereto; and the like.

The material of the formula

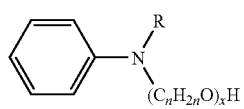

can be used as an intermediate material and reacted with a suitable diazonium compound to form an azo colorant, Suitable diazonium compounds have a diazonium salt group that can react with the intermediate material to form azo colorants as follows:

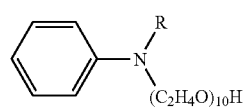 + 

↓

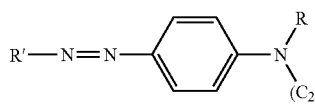

One specific example of a suitable reaction is as follows:

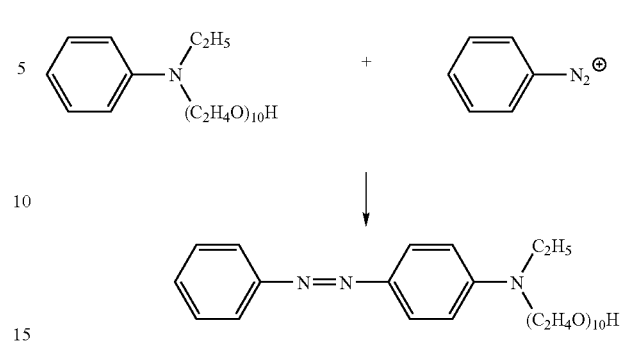

More specifically, a diazonium salt corresponding to the appropriate R' group is first prepared by dissolving or dispersing the corresponding primary amine R'—$NH_2$ in a cold mineral acid, typically at ice bath temperatures, with examples of suitable mineral acids including (but not being limited to) hydrochloric, hydrobromic, sulfuric, phosphoric, and the like, as well as mixtures thereof. If desired, a defoaming agent such as 2-ethylhexanol can also be present in the reaction mixture. The primary amine in acid is then reacted with an azotizing agent, such as sodium nitrite ($NaNO_2$), nitrosyl sulfuric acid ($HO_3SONO$), or the like, as well as mixtures thereof, to form the diazonium salt R'—N≡$N^+$. Thereafter, the reaction mixture can be neutralized to remove any excess $NO^+$ by addition of a $NO^+$ scavenger, such as sulfamic acid, urea, or the like, as well as mixtures thereof. The diazonium salt is then added to a solution containing the material of the formula

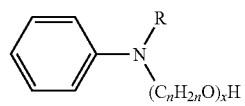

in a solvent, such as water, other polar solvents, or the like, as well as mixtures thereof, typically at ice bath temperatures, to form the azo colorant.

Colorants of the present invention can be reacted with various atoms, groups of atoms, monomers, oligomers, or polymers to form various colored monomers, oligomers, or polymers having covalently bonded thereto a colorant according to the present invention. Another embodiment of the present invention is directed to a compound comprising two or more moieties of the formula

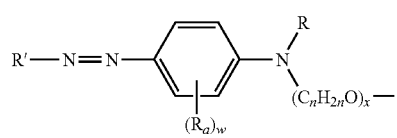

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer.

Examples of colored groups of atoms, monomers, oligomers, or polymers which can be prepared with the colorants of the present invention include urethane isocyanate-derived monomers, oligomers, or polymers, urea isocyanate-derived monomers, oligomers, or polymers, urethane/urea isocyanate-derived monomers, oligomers, or polymers, anhydride monomers, oligomers, or polymers, such as styrene-maleic anhydride monomers, oligomers, or polymers, ester/polyester monomers, oligomers, or polymers, carbonate/polycarbonate monomers, oligomers, or polymers, and the like. Colored urethane isocyanate-derived monomers, oligomers, or polymers, urea isocyanate-derived monomers, oligomers, or polymers, and urethane/urea isocyanate-derived monomers, oligomers, or polymers having covalently bonded thereto a colorant according to the present invention are generally the reaction product of a colorant according to the present invention and an isocyanate. Colored urethane isocyanate-derived monomers, oligomers, or polymers, urea isocyanate-derived monomers, oligomers, or polymers, and urethane/urea isocyanate-derived monomers, oligomers, or polymers having covalently bonded thereto a colorant according to the present invention can be prepared by, for example, processes such as those disclosed in U.S. Pat. No. 5,919,839; U.S. Pat. No. 3,994,835; U.S. Pat. No. 4,132,840; U.S. Pat. No. 4,751,254; U.S. Pat. No. 5,290,921; U.S. Pat. No. 5,270,363; U.S. Pat. No. 4,912,203; U.S. Pat. No. 4,846,846; U.S. Pat. No. 4,507,407; U.S. Pat. No. 4,284,729; U.S. Pat. No. 5,864,002; PCT patent application WO 97/13816; J. H. Saunders and K. C. Frisch's "Polyurethanes Part I, Chemistry" published by Interscience of New York, N.Y. in 1962; and Olin Chemicals' Luxate® IM isophorone diisocyanate technical product information sheet; the disclosures of each of which are totally incorporated herein by reference. Further information on isocyanate-derived resins is disclosed in, for example, U.S. Pat. No. 5,782,966; U.S. Pat. No. 5,750,604; U.S. Pat. No. 5,827,918; U.S. Pat. No. 5,830,942; U.S. Pat. No. 5,994,453; U.S. Pat. No. 6,180,692; U.S. Pat. No. 6,018,005; U.S. Pat. No. 6,028,138; U.S. Pat. No. 6,048,925; U.S. Pat. No. 6,057,399; and U.S. Pat. No. 5,783,658; the disclosures of each of which are totally incorporated herein by reference.

For example, a monoisocyanate reacts with an alcohol to form a urethane as follows:

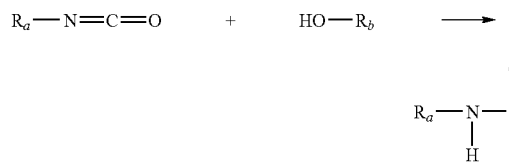

Diisocyanates react similarly; for example, isophorone diisocyanate reacts with two moles of alcohol to form a diurethane as follows:

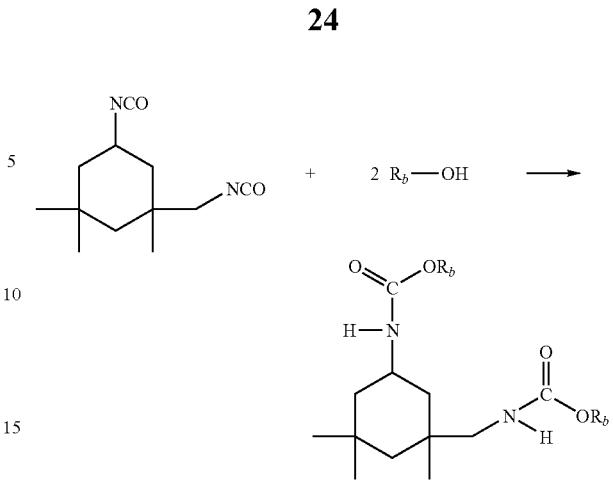

Monomeric, oligomeric, and polymeric materials can be prepared when HO—$R_b$ is a colorant according to the present invention.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl) ethylisocyantes; and the like, as well as mixtures thereof. Examples of diisocyanates include isophorone diisocyanate (IPDI); toluene diisocyanate CTDI); diphenylmethane-4,4'-diisocyanate (MDI); hydrogenated diphenylmethane-4,4'-diisocyanate (H12MDI), tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate: 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane compounds by condensing alcohols with isocyanates can be used to prepare polymeric colorants according to the present invention. Typically (although not necessarily), the reaction is carried out at elevated temperatures (for example, from about 60 to about 160° C.) in the presence of an optional urethane reaction catalyst, such as dibutyl tindilaurate, bismuth tris-neodecanoate, cobalt benzoate, lithium acetate, stannous octoate, triethylamine, or the like, In a specific embodiment, the reaction conditions are conducted in an inert atmosphere, such as argon or nitrogen gas or other suitable gases, to prevent oxidizing or yellowing of the reaction products and to prevent undesirable side reactions, The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted or amine-substituted antioxidant typically remaining. The reactants can be added together in any order and/or added to the reaction as physical mixtures. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are totally incorporated herein by reference, which provide further explanation of this chemistry.

Colored anhydride resins having covalently bonded thereto a colorant according to the present invention are generally the reaction product of a monomeric colorant according to the present invention and an anhydride. Colored anhydride resins having covalently bonded thereto a colorant according to the present invention can be prepared as disclosed in, for example, U.S. Pat. No. 6,110,264 and U.S. Pat. No. 6,322,624, the disclosures of each of which are totally incorporated herein by reference. Examples of suitable anhydrides include cyclic anhydrides, such as alkylsuccinic anhydrides, alkenylsuccinic anhydrides, and the like, as well as mixtures thereof. Specific examples include (but are not limited to) maleic anhydride, 2,3-diphenylmaleic anhydride, trimellitic anhydride, 2-phenylglutaric anhydride, homophthalic anhydride, isatoic anhydride, n-methylisatoic anhydride, 5-chloroisatoic anhydride, phthalic anhydride, 3,3',4,4'-benzophenone tetracarboxylic dianhydride, 4-methylphthalic anhydride, 4,4'-(hexafluoroisopropylidine)-diphthalic anhydride, 3,6-difluorophthalic anhydride, 3,6-dichlorophthalic anhydride, 4,5-dichlorophthalic anhydride, tetrafluorophthalic anhydride, tetrachlorophthalic anhydride, tetrabromophthalic anhydride, 3-hydroxyphthalic anhydride, 1,2,4-benzenetricarboxylic anhydride, 3-nitrophthalic anhydride, 4-nitrophthalic anhydride, 1,2,4,5-benzenetetracarboxylic dianhydride, diphenic anhydride, 1,8-naphthalic anhydride, 4-chloro-1,8-naphthalic anhydride, 4-bromo-1,8-naphthalic anhydride, 4-amino-1,8-naphthalic anhydride, 3-nitro-1,8-naphthalic anhydride, 4-nitro-1,8-naphthalic anhydride, 4-amino-3,6, disulfo-1,6-disulfo-1,8-napthalic anhydride dipotassium salt, 1,4,5,8-naphthalenetetracarboxylic dianhydride, 3,4,9,10-perylenetetracarboxylic dianhydride, cis-1,2,3,6-tetrahydrophthalic anhydride, cis-5-norbornene-endo-2,3dicarboxylic anhydride, endo-bicyco[2,2,2]oct-5-ene-2,3dicarboxylic anhydride, cantharidin, methyl-5-norbornene-2,3-dicarboxylic anhydride, exo-3,6,epoxy-1,2,3,6-tetrahydrophthalic anhydride, s-acetylmercaptosuccinic anhydride, diacetyl tartaric anhydride, bicyclo[2,2,2]octo-7-ene-2,3,5,6-tetracarboxylic dianhydride, citraconic anhydride, 2,3-dimethylmaleic anhydride, 1-cyclopentene-1,2-dicarboxylic anhydride, 3,4,5,6-tetrahydrophthalic anhydride, bromomaleic anhydride, dichloromaleic anhydride, 1,4,6,7,7-hexachloro-5-norbornene-2,3-dicarboxylic anhydride, cis-aconitic anhydride, glutaric anhydride, 3-methylglutaric anhydride, 2,2-dimethylglutaric anhydride, 3,3-dimethylglutaric anhydride, 3-ethyl-3-methylglutaric anhydride, 3,3tetramethyleneglutaric anhydride, hexafluoroglutaric anhydride, 3,5-diacetyltetrahydropyran-2,4,6-trione, ethylenediaminetetraacetic dianhydride, diethylenetriaminepentaacetic dianhydride, diglycolic anhydride, succinic anhydride, methylsuccinic anhydride, 2,2-dimethylsuccinic anhydride, isobuteneylsuccinic anhydride, 2-octen-1-ylsuccinic anhydride, octadecenylsuccinic anhydride, 3-oxabicyclo (3,1,0) hexane-2,4-dione, cis-1,2-cyclohexanedicarboxylic anhydride, trans-1,2-cyclohexanedicarboxylic anhydride, hexahydro-4-methylphthalic anhydride, itaconic anhydride, 2-dodecen-1-ylsuccinic anhydride, and the like, as well as mixtures thereof, For example, colored styrene-maleic anhydride resins having covalently bonded thereto a colorant according to the present invention are generally the reaction product of a monomeric colorant according to the present invention and styrene-maleic anhydride. Copolymers of anhydrides with styrene, butadiene, methoxyvinylether, ethylene, alpha-olefins, mixtures thereof, and the like, are all suitable examples of polymeric materials with which the monomeric colorants of the present invention can be reacted to form colored polymeric materials. Specific examples of suitable copolymers include (but are not limited to) poly (methyl vinyl ether-maleic acid), poly(acrylic acid-co-maleic acid), poly(vinyl chloride-co-vinyl-acetate-co-maleic acid), poly(ethylene-maleic anhydride), poly(maleic anhydride-1-octadecene), poly(styrene-co-maleic anhydride), poly(methyl vinyl ether-maleic anhydride), poly(ethylene-co-ethyl acrylate-co-maleic anhydride), poly(ethylene-co-vinyl acetate)-graft-maleic anhydride, polyethylene-graft-maleic anhydride, polypropylene-graft-maleic anhydride, and the like, as well as mixtures thereof.

The monomeric colorant compounds of the present invention, i.e., those containing only one moiety of the formula

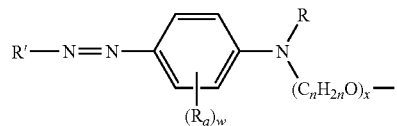

have no more than one —OH, —SH, or —NHR$_b$ group per molecule, wherein R$_b$ is a hydrogen atom, an alkyl group, an aryl group, an arylalkyl group, or an alkylaryl group. By this it is meant that, for example, if the molecule has one —OH group, it has no —SH groups, no —NHR$_b$ groups, and no additional —OH groups. Because the colorant compounds of the present invention have one and only one of these groups, in some embodiments of the invention various advantages can be achieved. For example, when these colorants are reacted with other materials to form colored resins, there is no formation of products of undesirably high molecular weight and no undesired crosslinking. Some advantages are particularly desirable for phase change ink applications. For example, when these colorants are reacted with other materials to form colored resins and when these colored resins are incorporated into a phase change ink, precipitation of the colorant from the ink is reduced; more specifically, when multifunctional colorants, rather that the chain terminating colorants of the present invention, are employed in reactions of di- or tri-isocyanates and monohydric alcoholic species, some higher molecular weight species are produced which can be insoluble in the ink base, often resulting or being manifested as a precipitate in the prepared material and/or the final ink. In addition, when these colorants are reacted with other materials to form colored resins and when these colored resins are incorporated into a phase change ink, clogging of printheads and the printer failure accompanying such clogging can be reduced.

The present invention is also directed to phase change inks. Another embodiment of the present invention is directed to a phase change ink comprising a phase change ink carrier and a colorant compound comprising one or more moieties of the formula

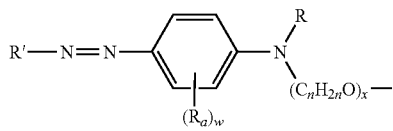

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein, when the colorant compound contains exactly one of the moieties, the moiety contains no more than one —OH, —SH, or primary or secondary amino group per molecule, and when the colorant compound contains more than one of the moieties, said moieties each contain no —OH groups, —SH groups, or primary or secondary amino groups.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

When the phase change ink of the present invention comprises a colored oligomer or polymer to which colorant molecules of the present invention are covalently bonded, this colored oligomer or polymer can function as the sole ink carrier. In addition, such a colored oligomer or polymer can be present in combination with another phase change ink carrier composition. Further, when the phase change ink of the present invention comprises a colorant of the present invention having only one moiety of the formula

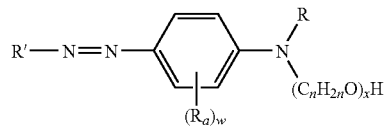

the colorant is generally present in combination with a phase change ink carrier composition. Any desired or effective carrier composition can be used. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

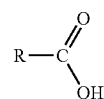

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2238792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises the ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a carboxylic acid derivative of a long chain alcohol having greater than thirty six carbon atoms, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges, and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks of the present invention contain a colorant compound comprising one or more moieties of the formula

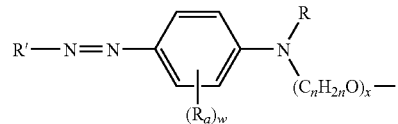

wherein R is an alkyl group, an aryl group, an arylalkyl group, or an alkylaryl group, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer. This colorant is present in the ink in any desired or effective amount to obtain the desired color or hue, in one embodiment of at least about 1 percent by weight of the ink, in another embodiment of at least about 2 percent by weight of the ink, and in yet another embodiment of at least about 3 percent by weight of the ink, and in one embodiment of no more than about 20 percent by weight of the ink, in another embodiment of no more than about 13 percent by weight of the ink, and in yet another embodiment of no more than about 6 percent by weight of the ink, although the amount can be outside of these ranges. The colorant according to the present invention can either be the sole colorant in the ink or can be present in combination with other colorants, such as dyes, pigments, mixtures thereof, and the like.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Uniroyal Chemical Company, Oxford, Conn., IRGANOX® 1010, commercially available from Ciba Geigy, and the like, When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTACO 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present invention in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions of the present invention generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions of the present invention can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present invention are solid at ambient temperature.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment thereof, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, and the like. Phase change inks of the present invention can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

Example I

Phase Separation of N-Ethyl Aniline Ethoxylate

To a 100 milliliter beaker equipped with a magnetic stirrer was added about 50 milliliters of POE(10) N-ethyl aniline, of the formula

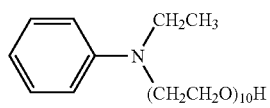

(obtained from Henkel Corp, Mauldin, S.C.) and about 65 milliliters of deionized water. The mixture was placed on a magnetic stirring hot plate and stirring and heating were initiated. When the temperature reached 90° C., the beaker was removed from heat and stirring and was allowed to cool slowly. After several minutes, separation of layers began to occur, and after about 2 hours, the temperature had returned to room temperature and the separation was complete. A separation of the two layers was visually observed, and separation of the layers was performed with a separatory funnel.

Colorant Preparation

To a 500 milliliter 3-necked kettle equipped with a thermometer, Trubore stirrer, and constant pressure addition funnel was added about 115 grams of 85 percent $H_3PO_4$ (obtained from Olin Corp., Norwalk, Conn.) in water, about 31 grams of 95 percent $H_2SO_4$ (obtained from Olin Corp., Norwalk, Conn.) in water, and 2 drops of 2-ethylhexanol (obtained from Aldrich Chemical Co., Milwaukee, Wis.). Stirring was then initiated and the kettle was placed in a salt/ice bath to cool the mixture to about 0° C. Once 0° C. was reached, 10.2 grams of 2-amino-4-methylbenzothiazole (obtained from Aldrich Chemical Co.) was added with stirring and the temperature was maintained at 0° C. To the constant pressure addition funnel was then added about 21.7 grams of nitrosyl sulfuric acid (obtained from Aldrich Chemical Co.) in a dropwise fashion, maintaining the temperature at about 0° C., over a period of about 1.5 hours. The reaction mixture was subsequently maintained at 0° C. with stirring for an additional 1.5 hours to ensure complete diazotization. Thereafter, about 0.7 gram of sulfamic acid (obtained from Aldrich Chemical Co.) was added with stirring to neutralize any excess $NO^+$. The diazo mixture was then slowly added over about 0.75 hour to a 1 liter beaker equipped with a stir magnet in a 5° C. ice bath, the beaker containing about 36.0 grams of the POE(10) N-ethyl aniline purified as indicated above, 150 milliliters of deionized water, and about 2.0 grams of urea (obtained from Aldrich Chemical Co.). The diazo colorant was allowed to stir cool for about 2 hours, followed by stirring at room temperature overnight. The diazo colorant was then neutralized to a pH of about 7 with a 50 percent aqueous solution of sodium hydroxide (solid material obtained from Aldrich Chemical Co.), keeping the temperature below about 60° C. Following neutralization, the colorant was poured into a 1 liter separatory funnel and allowed to phase separate. The bottom salt/water layer was discarded and the liquid colored product layer was dissolved in methylene chloride (obtained from Aldrich Chemical Co.) and run through a small "plug" of silica gel (70-230 mesh, for column chromatography, obtained from Aldrich Chemical Co.) to remove any polar impurities. The methylene chloride layer was then collected and the methylene chloride removed via rotary evaporation, yielding a viscous red liquid. The resulting colorant is expected to have an absorption maxima consistent with the following structure:

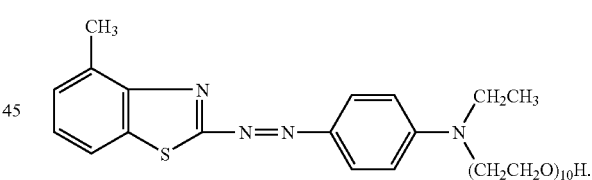

Example II

To a 500 milliliter 3-necked kettle equipped with a thermometer, Trubore stirrer, and constant pressure addition funnel was added about 27.0 grams of deionized water, about 20 grams of 95 percent $H_2SO_4$ (obtained from Olin Corp., Norwalk, Conn.) in water, and 2 drops of 2-ethylhexanol (obtained from Aldrich Chemical Co., Milwaukee, Wis.). Stirring was then initiated and the kettle was placed in a salt/ice bath to cool the mixture to about 0° C. Once 0° C. was reached, 10.3 grams of 2-chloro-4-(methylsulfone) aniline (CAMSU, obtained from Clariant Corp., Charlotte, N.C.) was added with stirring and the temperature was maintained at 0° C. To the constant pressure addition funnel was then added about 21.0 grams of nitrosyl sulfuric acid (obtained from Aldrich Chemical Co.) in a dropwise fashion, maintaining the temperature at about 0° C., over a period of about 1.5 hours. The reaction mixture was subsequently maintained at 0° C. with stirring for an additional 1.5 hours to ensure complete diazotization. Thereafter, about 1.0 gram of sulfamic acid (obtained from Aldrich Chemical Co.) was added with stirring to neutralize any excess NO⁺. The diazo mixture was then slowly added over about 0.75 hour to a 1 liter beaker equipped with a stir magnet in a 5° C. ice bath, the beaker containing about 29.1 grams of the POE(10) N-ethyl aniline purified as indicated in Example I, 150 milliliters of deionized water, and about 2.0 grams of urea (obtained from Aldrich Chemical Co.). The diazo colorant was allowed to stir cool for about 2 hours, followed by stirring at room temperature overnight. The diazo colorant was then neutralized to a pH of about 7 with a 50 percent aqueous solution of sodium hydroxide (solid material obtained from Aldrich Chemical Co.), keeping the temperature below about 60° C. Following neutralization, the colorant was poured into a 1 liter separatory funnel and allowed to phase separate. The bottom salt/water layer was discarded and the liquid colored product layer was dissolved in methylene chloride (obtained from Aldrich Chemical Co.) and run through a small "plug" of silica gel (70-230 mesh, for column chromatography, obtained from Aldrich Chemical Co.) to remove any polar impurities. The methylene chloride layer was then collected and the methylene chloride removed via rotary evaporation, yielding a viscous orange liquid. The resulting colorant was consistent with the following formula:

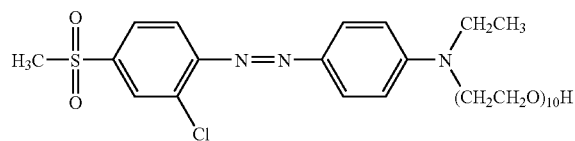

Example III

The process of Example I is repeated except that a random POE (3.5) POP (6.5) N-ethyl aniline, of the formula

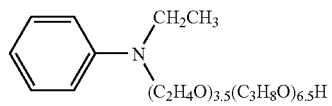

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (available as SO-7864 from Henkel Corp., Mauldin, S.C.) is substituted for the POE(10) N-ethyl aniline. It is believed that a colorant consistent with the formula

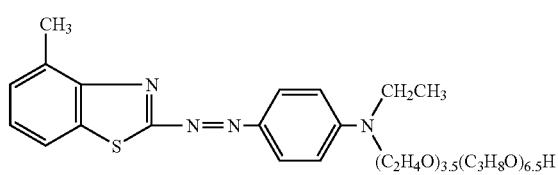

will be obtained.

Example IV

The process of Example II is repeated except that a random POE (3.5) POP (6.5) N-ethyl aniline, of the formula

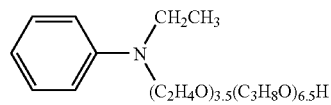

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (available as SO-7864 from Henkel Corp., Mauldin, S.C.) is substituted for the POE(10) N-ethyl aniline. It is believed that a colorant of the formula

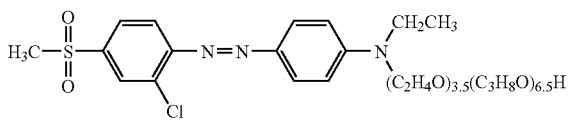

will be obtained.

Example V

Reaction Product of Benzophenonetetracarboxylic Dianhydride, Octophenol Ethoxylate, and Red Azo Monohydroxyl Polyoxyalkylene Colorant To a 1,000 milliliter three-neck resin kettle equipped with a Trubore stirrer, $N_2$ inlet, and thermocouple-temperature controller is added 150.0 grams (0.93 equivalents) of benzophenonetetracarboxylic dianhydride (available from Aldrich Chemical Co., Milwaukee, Wis.) and 211.6 grams (0.83 equivalents) of IGEPALO CA-210 (octylphenol ethoxylate, available from Rhone-Poulenc Co., Cranbury, N.J. Note: TRITON® X15 octylphenol ethoxylate, available from Union Carbide Chemicals and Plastics Company Inc., Danbury, Conn., can be directly substituted for IGEPAL® CA-210 in this reaction). The reaction mixture is heated to 150° C. with stirring under nitrogen. After 1.0 hours at 150° C., the temperature is increased to 170° C. and held at that temperature for 3.5 hours. A red azo monohydroxyl polyoxyalkylene colorant (74.3 grams; 0.098 equivalents) corresponding to the colorant prepared in Example I is then added and allowed to react for 3 hours. The final red colored resin product is then poured into aluminum molds and allowed to cool and harden.

Example VI

The colored resin prepared in Example V (20.5 grams) is combined with 58.7 grams of stearyl stearamide wax (KEMAMIDE® S-180, available from Crompton Corporation, Greenwich, Conn.), 20.5 grams of glycerol ester of hydrogenated abietic (rosin) acid (KE-100, available from Arakawa Chemical Industries, Ltd.), and 0.2 gram of NAUGUARD® 445 antioxidant (available from Uniroyal Chemical Co., Middlebury, Conn.). The ingredients are heated to 115° C.

until molten, mixed, filtered through a disc filter, poured into sticks, and used to generate prints in a XEROX® PHASER 860 printer.

Example VII

Reaction Product of Octylphenol Ethoxylate, Isophorone Diisocyanate, and Red Azo Monohydroxyl Polyoxyalkylene Colorant 525.0 grams (4.73 equivalents) of isophorone diisocyanate (DESMODUR I; isophorone diisocyanate, available from Bayer Corp., Pittsburgh, Pa.) and 1.5 grams of dibutyltindilaurate catalyst (available from Aldrich Chemical Co., Milwaukee, Wis.), followed by 1,150 grams (4.52 equivalents) of octylphenol ethoxylate (IGEPAL CA-210, octylphenol ethoxylate, available from Rhone-Poulenc Co., Cranbury, N.J.), are added to a 3,000 milliliter three-neck resin kettle equipped with a Trubore stirrer, $N_2$ atmosphere inlet, and a thermocouple-temperature controller. The reaction mixture is heated to about 135° C. with stirring under nitrogen. After 2.0 hours at about 135° C., 156 grams (0.210 equivalents) of a red azo monohydroxyl polyoxyalkylene colorant prepared as described in Example I is added and the reaction mixture is heated for approximately 2 hours. An additional 110.0 grams (0.433 equivalents) of octylphenol ethoxylate are added and the reaction mixture is heated at about 150° C. for approximately 2 hours. An FT-IR of the product is obtained to ensure that all of the isocyanate (NCO) functionality has been consumed. The absence (disappearance) of a peak at about 2285 $cm^{-1}$ (NCO) and the appearance (or increase in magnitude) of peaks at about 1740-1680 $cm^{-1}$ and about 1540-1530 $cm^{-1}$ corresponding to urethane frequencies are used to confirm that the isocyanate has been consumed. The diurethane reaction product is then poured into aluminum molds and allowed to cool and harden.

Example VIII

In a stainless steel beaker are combined 500 grams of stearyl stearamide wax (KEMAMIDE® S-180, available from Crompton Corporation, Greenwich, Conn.), 125 grams of UNIREZ 2970 tetra-amide resin (available from Union Camp, Wayne, N.J.), 208 grams of the colored resin prepared as described in Example VII, and 1.6 grams of NAUGUARD® 445 antioxidant (available from Uniroyal Chemical Co., Middlebury, Conn.). The materials are melted together at a temperature of about 140° C. in an oven, then blended by stirring in a temperature controlled mantle at about 115° C. for about 0.5 hour. After stirring, the resulting ink is filtered through a heated Mott apparatus (available from Mott Metallurgical) using #3 Whatman filter paper and a pressure of about 15 psi. The filtered phase change ink is then poured into molds, allowed to solidify to form ink sticks, and used to generate prints in a XEROX® PHASER 860 printer.

Example IX

Reaction Product of Styrene-Maleic Anhydride Polymer with Neodol 1-3 and Red Azo Monohydroxyl Polyoxyalkylene Colorant To a 500 milliliter three-neck resin kettle equipped with a TEFLON® coated magnet, oil bath, and condenser was added 14.0 grams (0.068 equivalents) of styrene-maleic anhydride polymer (SMA 1000, available from Atochem Inc., Malvern, Pa.), 15.9 grams (0.052 equivalents) of an alcohol of the formula $C_{11}H_{22}$—O—$(CH_2CH_2O)_n$H wherein n has an average value of 3 (NEODOL 1-3, available from Shell Chemical Company, Houston, Tex.), 12.7 grams (0.017 equivalents) of the red azo monohydroxyl polyoxyalkylene colorant prepared in Example I, about 250 grams of acetonitrile (available from Aldrich Chemical Co., Milwaukee, Wis.), and 2 drops of 1-methylimidazole catalyst (available from Aldrich Chemical Co.). The reaction mixture was heated with stirring to reflux and held at that state for 2 days. After 2 days, the acetonitrile was removed by distillation. The red viscous colored product still in the flask was then placed in a vacuum oven to remove any residue of acetonitrile. The final red viscous material had a $T_g$ of −38° C.

Example X

To a 100 milliliter beaker equipped with magnetic stir was added about 8 grams of the red material prepared as described in Example IX and 35 milliliters of concentrated ammonia solution. Stirring was continued until all the solid material dissolved. About 2 milliliters of this aqueous solution was placed on the platen of a K-proofer and prints were made. The prints were allowed to dry and tested for washfastness. No bleeding of color was observed.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A compound comprising two or more moieties of the formula

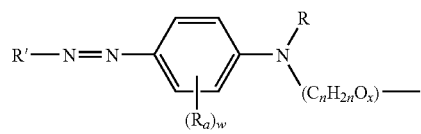

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units and is at least about 2, wherein said moieties each contain no —OH groups, —SH groups, or primary or secondary amino groups, said moieties being linked by a central atom or group of atoms.

2. A compound according to claim 1 wherein R is an alkyl group with at least one carbon atom and with no more than about 50 carbon atoms, an aryl group with at least about 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms.

3. A compound according to claim 1 wherein R is ethyl.

4. A compound according to claim 1 wherein R' is an aryl group, an arylalkyl group, an alkylaryl group.

5. A compound according to claim 1 wherein R' is an aryl group with at least about 2 carbon atoms and with no more than about 60 carbon atoms, an arylalkyl group with at least about 3 carbon atoms and with no more than about 60 carbon atoms, or an alkylaryl group with at least about 3 carbon atoms and with no more than about 60 carbon atoms.

6. A compound according to claim 1 wherein R' is selected from the group consisting of (1) thiophene derivatives of the formula

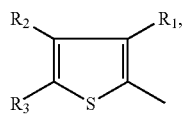

(2) benzothiazole derivatives of the formula

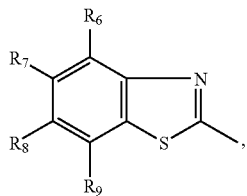

(3) benzoisothiazole derivatives of the formulae

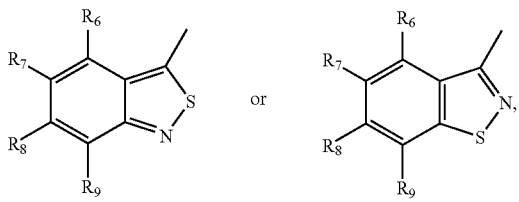

(4) thiadiazole derivatives of the formulae

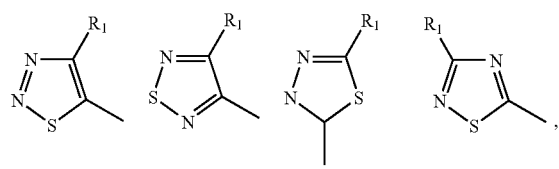
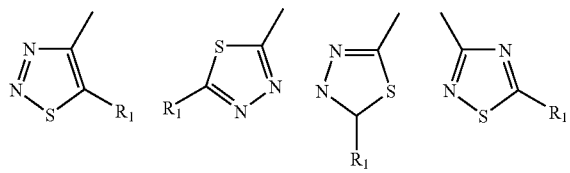

(5) benzene derivatives of the formula

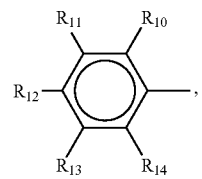

and (6) imidazole derivatives of the formula

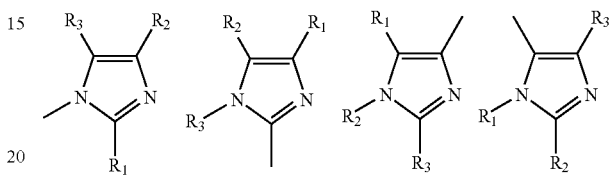

wherein $R_1$, $R_2$, $R_3$, $R_6$, $R_7$, $R_8$, $R_9$, $R_{10}$, $R_{11}$, $R_{12}$, $R_{13}$, and $R_{14}$ each, independently of the other, is a hydrogen atom, a halogen atom, a cyano group, an alkyl group, an aryl group, an arylalkyl group, an alkylaryl group, an alkoxy group, an aryloxy group, an arylalkyloxy group, an alkylaryloxy group, a sulfonamidoalkyl group, a sulfonamidoaryl group, a sulfonamidoarylalkyl group, a sulfonamidoalkylaryl, group, a sulfonamidodialkyl group, a sulfonamidodiaryl group, a sulfonamidodiarylalkyl group, a sulfonamidodialkylaryl group, an amidoalkyl group, an amidoaryl group, an amidoarylalkyl group, an amidoalkylaryl group, an amidodialkyl group, an amidodiaryl group, an amidodiarylalkyl group, an amidodialkylaryl group, an amidodiarylalkyl group, a thioalkyl group, a thioaryl group, a thioarylalkyl group, a thioalkylaryl group, an ester group of the formula

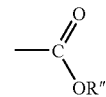

wherein R" is an alkyl group, an aryl group, an arylalkyl group, or an alkylaryl group, a ketone group of the formula

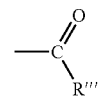

wherein R''' is an alkyl group, an aryl group, an arylalkyl group, or an alkylaryl group, a sulfone group of the formula —SO₂R"" wherein R"" is an alkyl group, an aryl group, an arylalkyl group, or an alkylaryl group.

7. A compound according to claim 1 wherein R' is (a) of the formula

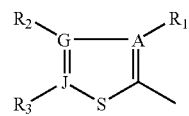

wherein A, G, and J each, independently of the others, is a carbon atom or a hetero atom, $R_1$, $R_2$, and $R_3$ each, independently of the other, is a hydrogen atom, a halogen atom, a cyano group, an alkyl group, an aryl group, an arylalkyl group, an alkylaryl group, an alkoxy group, an aryloxy group, an arylalkyloxy group, an alkylaryloxy group, a sulfonamidoalkyl group, a sulfonamidoaryl group, a sulfonamidoarylalkyl group, a sulfonamidoalkylaryl, group a sulfonamidodialkyl group, a sulfonamidodiaryl group, a sulfonamidodiarylalkyl group, a sulfonamidodialkylaryl group, an amidoalkyl group, an amidoaryl group, an amidoarylalkyl group, an amidoalkylaryl group, an amidodialkyl group, an amidodiaryl group, an amidodiarylalkyl group, an amidodialkylaryl group, an amidodiarylalkyl group, a thioalkyl group, a thioaryl group, a thioarylalkyl group, a thioalkylaryl group, an ester group of the formula

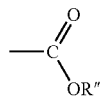

wherein R" is an alkyl group, an aryl group, an arylalkyl group, or an alkylaryl group, a ketone group of the formula

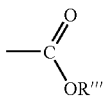

wherein R'" is an alkyl group, an aryl group, an arylalkyl group, or an alkylaryl group, a sulfone group of the formula —$SO_2R''''$ wherein R"" is an alkyl group, an aryl group, an arylalkyl group, or an alkylaryl group; (b) of the formula

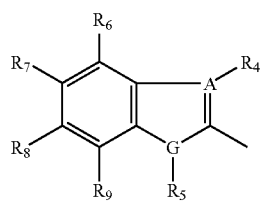

wherein $R_4$, $R_5$, $R_6$, $R_7$, $R_8$, and $R_9$ each, independently of the others, can be selected from the same groups as $R_1$, $R_2$, and $R_3$; or (c) those of the formula

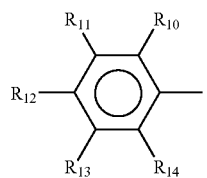

wherein $R_{10}$, $R_{11}$, $R_{12}$, $R_{13}$, and $R_{14}$ each, independently of the others, can be selected from the same groups as $R_1$, $R_2$, and $R_3$.

8. A compound according to claim 1 wherein R' is

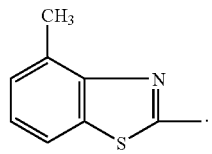

9. A compound according to claim 1 wherein R' is

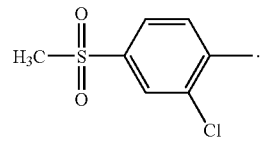

10. A compound according to claim 1 wherein n is at least about 2 and wherein n is no more than about 18.

11. A compound according to claim 1 wherein n is no more than about 4.

12. A compound according to claim 1 wherein x is at least about 2 and wherein x is no more than about 100.

13. A compound according to claim 1 wherein x is at least about 5 and wherein x is no more than about 20.

14. A compound according to claim 1 wherein each $R_a$, independently of the others, is a fluorine atom, a chlorine atom, a bromine atom, an iodine atom, an alkyl group with at least one carbon atom and with no more than about 25 carbon atoms, an alkoxy group with at least one carbon atom and with no more than about 25 carbon atoms, a nitrile group, a nitro group, an amide group of the formula

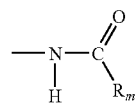

wherein $R_m$ is a hydrogen atom, an alkyl group with at least 1 carbon atom and with no more than about 50 carbon atoms, an aryl group with at least 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms, or a sulfonamide group of the formula

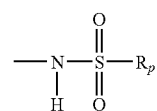

wherein $R_p$ is a hydrogen atom, an alkyl group with at least 1 carbon atom and with no more than about 50 carbon atoms, an aryl group with at least 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms.

15. A compound according to claim 1 wherein the moieties are linked by a group of atoms which is derived from an isocyanate.

16. A compound according to claim 15 wherein the isocyanate is a diisocyanate.

17. A compound according to claim 16 wherein the diisocyanate is isophorone diisocyanate; toluene diisocyanate; diphenylmethane-4,4'-diisocyanate; hydrogenated diphenylmethane-4,4'-diisocyanate; tetra-methyl xylene diisocyanate; hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-d isocyanatododecane; 1,5-diisocyanato-2-methylpentane; 1,4-diisocyanatobutane; cyclohexylene diisocyanate; a uretidione dimer of hexamethylene-1,6-diisocyanate; or mixtures thereof.

18. A compound according to claim 15 wherein the isocyanate is a triisocyanate.

19. A compound according to claim 1 wherein the moieties are linked by a group of atoms which is a urethane.

20. A compound comprising two or more moieties of the formula

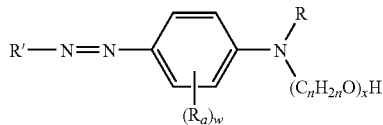

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a group of atoms which is an anhydride.

21. A compound according to claim 20 wherein the anhydride is a cyclic anhydride.

22. A compound according to claim 20 wherein the anhydride is 3,3',4,4'-benzophenone tetracarboxylic dianhydride, 4,4'-(hexafluoroisopropylidine)-diphthalic anhydride, 1,2,4,5-benzenetetracarboxylic dianhydride, 1,4,5,8-naphthalenetetracarboxylic dianhydride, 3,4,9,10-perylenetetracarboxylicdianhydride, bicyclo[2,2,2]octo-7-ene-2,3,5,6-tetracarboxylicdianhydride, ethylenediaminetetraacetic dianhydride, diethylenetriaminepentaacetic dianhydride, or mixtures thereof.

* * * * *